United States Patent
Arnold et al.

(10) Patent No.: US 11,597,206 B2
(45) Date of Patent: Mar. 7, 2023

(54) PURGING MANIFOLDS

(71) Applicant: HEWLETT-PACKARD DEVELOPMENT COMPANY, L.P., Spring, TX (US)

(72) Inventors: Christopher John Arnold, Vancouver, WA (US); Paul Allan Osborne, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/500,416

(22) PCT Filed: Mar. 12, 2018

(86) PCT No.: PCT/US2018/022048
§ 371 (c)(1),
(2) Date: Oct. 3, 2019

(87) PCT Pub. No.: WO2019/177582
PCT Pub. Date: Sep. 19, 2019

(65) Prior Publication Data
US 2021/0001633 A1    Jan. 7, 2021

(51) Int. Cl.
*B41J 2/175*     (2006.01)
*B41J 2/17*      (2006.01)
(Continued)

(52) U.S. Cl.
CPC ............ *B41J 2/1714* (2013.01); *B41J 2/175* (2013.01); *B41J 2/17523* (2013.01); *B41J 2/18* (2013.01); *B41J 2/19* (2013.01)

(58) Field of Classification Search
None
See application file for complete search history.

(56) References Cited

U.S. PATENT DOCUMENTS

| 5,276,468 A | 1/1994 | Deur et al. |
| 5,788,388 A | 8/1998 | Cowger et al. |
| (Continued) | | |

FOREIGN PATENT DOCUMENTS

| CN | 102381038 A | 3/2012 |
| CN | 103386818 A | 11/2013 |
| (Continued) | | |

*Primary Examiner* — Matthew Luu
*Assistant Examiner* — Tracey M McMillion
(74) *Attorney, Agent, or Firm* — Shook, Hardy & Bacon, L.L.P.

(57) ABSTRACT

In some examples a printing system includes purging manifolds. The printing system includes a fluid ejection device to dispense a fluid and a first reservoir to house a fluid. The system further includes a purging manifold to fluidically couple to the fluid ejection device, and the purging manifold to fluidically couple to the first reservoir. The purging manifold includes a second reservoir. The purging manifold further includes a supply port; a fluid inlet port; and a purging outlet port. The purging outlet port is disposed above the supply port to convey fluid to the first reservoir. The printing system also includes a fluid interface connector to fluidically connect to the supply port and fluidically connect to the fluid ejection device.

13 Claims, 12 Drawing Sheets

(51) Int. Cl.
  *B41J 2/18* (2006.01)
  *B41J 2/19* (2006.01)

(56) References Cited

U.S. PATENT DOCUMENTS

| | | | |
|---|---|---|---|
| 6,152,559 | A | 11/2000 | Kojima |
| 6,275,664 | B1 | 8/2001 | Wolf et al. |
| 6,565,197 | B1 | 5/2003 | Murray et al. |
| 6,752,493 | B2 | 6/2004 | Dowell et al. |
| 6,942,324 | B2 | 9/2005 | Campion et al. |
| 6,955,423 | B2 | 10/2005 | Rodriguez |
| 7,210,771 | B2 | 5/2007 | Neese et al. |
| 7,770,883 | B2 | 8/2010 | Jensen |
| 8,220,910 | B2 | 7/2012 | Wanibe |
| 9,358,803 | B2 | 6/2016 | Moriguchi et al. |
| 10,124,597 | B2 * | 11/2018 | Alessi ................ B41J 2/18 |
| 2001/0020971 | A1 | 9/2001 | Usui |
| 2002/0047882 | A1 | 4/2002 | Karlinski et al. |
| 2004/0056918 | A1 | 3/2004 | Wang et al. |
| 2005/0168540 | A1 | 8/2005 | Wilson |
| 2007/0081019 | A1 | 4/2007 | Vesa et al. |
| 2009/0027449 | A1 | 1/2009 | Silva et al. |
| 2010/0208016 | A1 | 8/2010 | Menchik et al. |
| 2012/0169813 | A1 | 7/2012 | Gray |
| 2012/0293592 | A1 | 11/2012 | Hibbard et al. |
| 2014/0146110 | A1 | 5/2014 | Melde |
| 2014/0300666 | A1 | 10/2014 | Johnson |
| 2016/0193785 | A1 | 7/2016 | Bell et al. |
| 2017/0021618 | A1 * | 1/2017 | Lecheheb ................ B41J 2/175 |
| 2017/0259580 | A1 * | 9/2017 | Olsen ................ B41J 2/17596 |
| 2017/0320331 | A1 | 11/2017 | Alessi et al. |

FOREIGN PATENT DOCUMENTS

| | | |
|---|---|---|
| CN | 104369539 A | 2/2015 |
| CN | 107073946 A | 8/2017 |
| CN | 107415469 A | 12/2017 |
| WO | WO-2017034951 A1 | 3/2017 |
| WO | WO2017064665 A1 | 4/2017 |

* cited by examiner

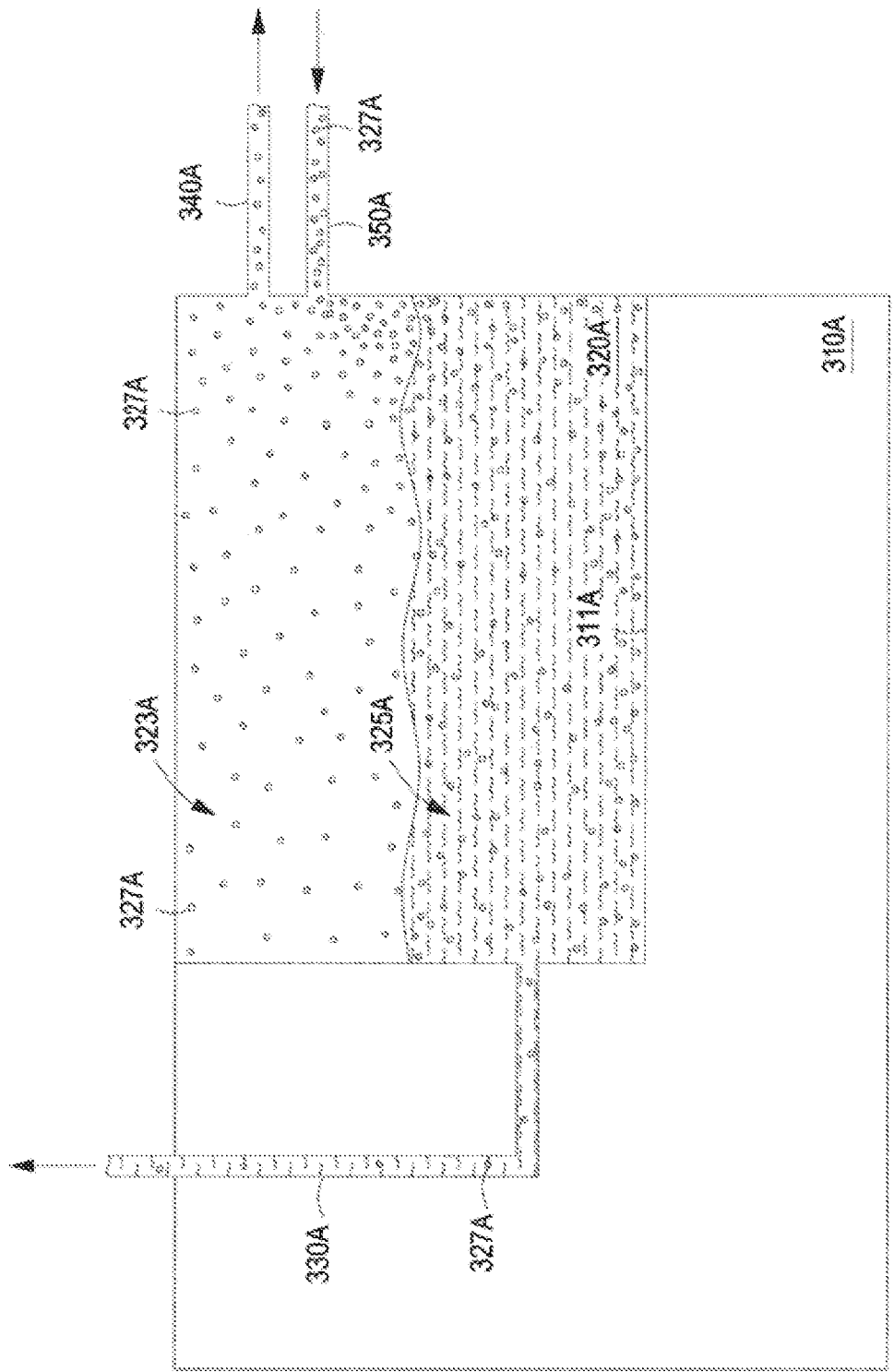

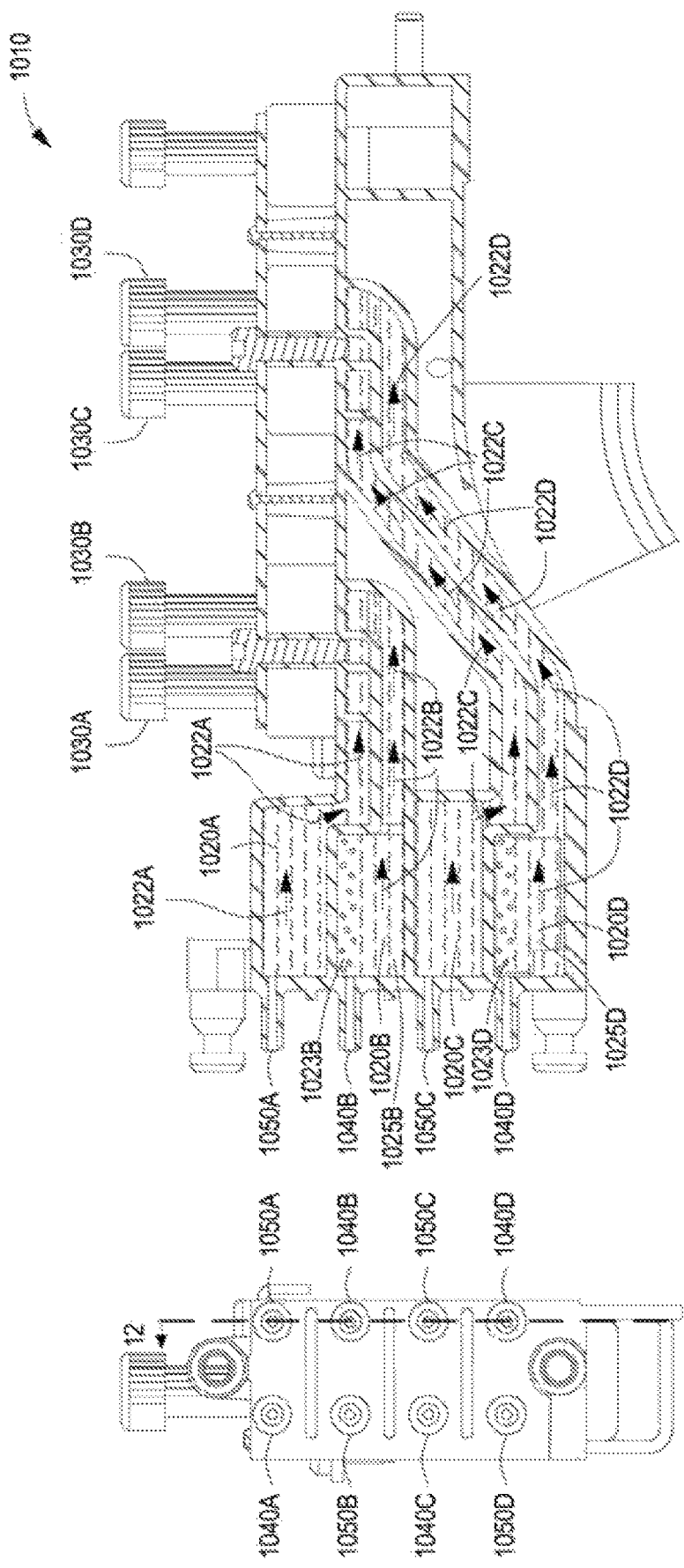

PURGING MANIFOLDS

BACKGROUND

A printing system can include a fluid ejection device that has nozzles to dispense printing fluid to a target. In a two-dimensional (2D) printing system, the target is a medium, such as a paper or another type of substrate onto which fluid is dispensed. Examples of 2D printing systems include inkjet printing systems that dispense droplets of inks. In a three-dimensional (3D) printing system, the target can be a layer or multiple layers of build material deposited to form a 3D object.

DRAWINGS

FIGS. 3A-3C are block diagrams of some components of an example purging manifold.

FIG. 11 is a left side view of the example purging manifold of FIG. 10.

FIG. 12 is a side cross-sectional view of the example purging manifold of FIG. 11 taken along line 12-12'.

Figure 1:
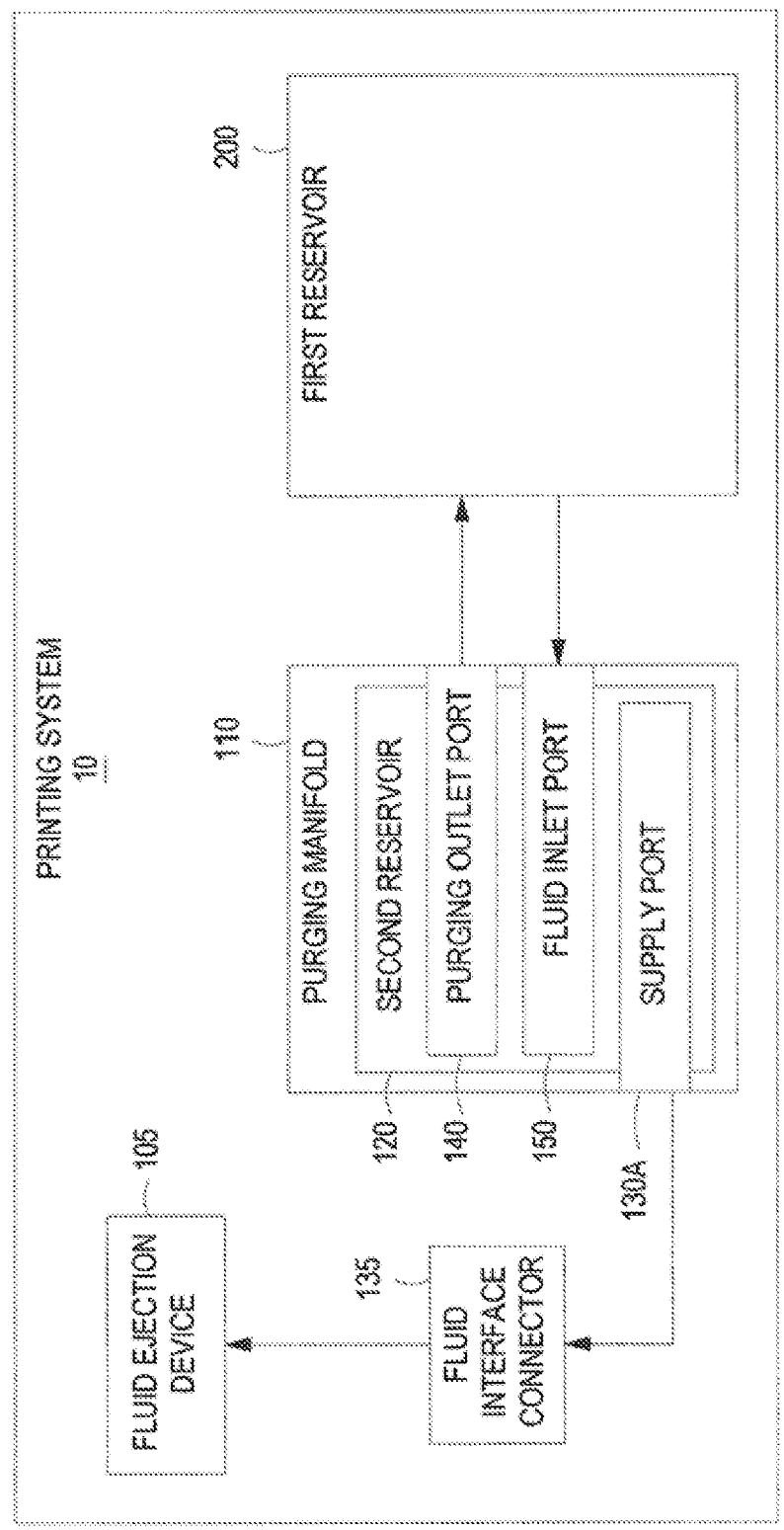
FIG. 1 is a block diagram of some components of an example printing system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DESCRIPTION

A printing system can include multiple components that are connected together. For example, a fluid ejection device can be removably installed into the printing system. A "fluid ejection device" can refer to an assembly that includes at least one fluid ejection die to selectively eject fluid drops from nozzles formed therein. In some examples, the fluid ejection device can be mounted to span a print target (e.g., width) in a printing system.

Fluids may pass to the fluid ejection device from other components in printing systems, such as various reservoirs or manifolds. During conveyance of fluids through such reservoirs and manifolds and operation of the printing system, additional amounts of gasses, such as air, may be introduced into the fluids. Accordingly, the fluids may include a printing material (in liquid form) and a gas, such as air.

In some printing systems, a fluid ejection device may not operate effectively when gases are present in the fluid to be dispensed. For example, air bubbles in the fluid may reduce or prevent the ejection of a drop of liquid printing material from nozzles of the fluid ejection device. Some example printing systems may include various mechanisms to reduce the amount of gas in a fluid to be ejected. For example, some printing systems include filters to separate gases from liquid printing materials in a fluid. In other examples, some printing systems include valves to control the flow of fluids containing gases to a fluid ejection device by, for example, selectively reversing the flow of the fluid. Other example printing systems include various mechanisms to reduce the amount of gas in a fluid in a printing system, such as air impenetrable materials and/or components. However, the use of such filters, valves, and air impenetrable materials in printing systems may increase production costs and product size. For example, an air impenetrable material may limit the configuration of components in the printing system.

To address these concerns, examples provided herein include a purging manifold to couple to a fluid ejection device and couple to a reservoir of the printing system. The purging manifold includes a reservoir to store a fluid that may facilitate separation of gas and liquid prior to ejection of liquid printing material. The purging manifold may include a supply port to couple to the fluid ejection device which provides liquid printing material (i.e., a fluid from which at least some gas has been separated). The purging manifold may also include a fluid inlet port to receive a fluid and a purging outlet port to provide fluid. The fluid inlet port and purging outlet port may convey and/or supply a fluid including gases therein. In some example purging manifolds liquid printing material may be conveyed to a fluid ejection device without the use of a filter or valve to remove gas from the fluid that includes the liquid printing material. In such examples, a purging manifold may further facilitate the implementation of air penetrable flexible tubing to convey fluid to the purging manifold, which may further reduce the footprint of a printing system.

In examples, a printing system can be digital titration devices, pharmaceutical dispensation devices, lab-on-chip devices, fluidic diagnostic circuits, two-dimensional (2D) or three-dimensional (3D) printing systems, and/or other such devices in which amounts of fluids may be dispensed/ejected. A 2D printing system dispenses printing fluid, such as ink, to form images on a medium. A 3D printing system forms a 3D object by depositing successive layers of build material. Printing agents dispensed from the 3D printing system can include ink, as well as agents used to fuse powders of a layer of build material, detail a layer of build material (such as by defining edges or shapes of the layer of build material), and so forth.

As used herein, a "purging manifold" or "fluid manifold" may refer to a structure that includes a chamber with inbound and outbound fluid channels to allow fluids to communicate from the inbound fluid channels via the outbound fluid channels to other components of a printing system, such as a fluid ejection device. In examples, a "port" refers to structure and/or opening from a chamber to fluidically couple the chamber to another component of a printing system. In some examples, a port may include a fluid interface connector to form a connection to another component. In other examples, the port may include intermediate tubes or channels between the chamber and a fluid interface connector.

As used herein, a "fluid interface connector" may refer to a structure(s) to connect a first component with a second component and provide a fluid to the second component from the first component. In examples, a "printing material" may refer to any material to be deposited by a fluid ejection device of a printing system. In examples, printing materials may be detailing agents, fusing agents, glosses, moisturizers, binders, cleaners, colorants, etc. In examples, a colorant may include a carrier and pigments or dyes, etc. In such an example, the colorant may include inks, toners, plastics, polymers, powdered metals, alloys and the like. In examples, a "medium," "print target," or "target" may include paper, photopolymers, thermopolymers, plastics, textiles, composites, metals, woods, glass, or the like.

Some example fluid ejection devices may be printheads. In some examples, a substrate of a fluid ejection device may be formed with silicon or a silicon-based material. Various features of a fluid ejection device, such as nozzles, may be formed by etching and/or other such microfabrication processes.

Nozzles may facilitate ejection/dispensation of a fluid. Fluid ejection devices may include fluid ejection actuators disposed proximate to the nozzles to cause fluid to be ejected/dispensed from a nozzle orifice. Some examples of types of fluid ejectors implemented in fluid ejection devices include thermal ejectors, piezoelectric ejectors, and/or other such ejectors that may cause fluid to eject/be dispensed from a nozzle orifice.

In examples, terms such as "lower," "upper," "below," "above," or any other terms indicating relative orientations of components can refer to a relative orientation when the components are arranged against the force of gravity (i.e., vertically). However, if the components have a different arrangement (e.g., a horizontal arrangement, a diagonal arrangement, etc.), then such terms can specify a different relative orientation (side-by-side orientation, left-right orientation, diagonal orientation, etc.).

Turning now to the figures, and particularly to FIG. 1, this figure provides block diagram of some components of an example printing system. Example printing system 10 may include a fluid ejection device 105, a purging manifold 110, first reservoir 200, and a fluid interface connector 135. The example fluid ejection device 105 includes nozzles through which fluids are dispensed. The example first reservoir 200 may be any chamber or reservoir to store, house, or hold a fluid. The example purging manifold 110 includes a second reservoir 120, a supply port 130A, a purging outlet port 140, and a fluid inlet port 150.

In examples, purging manifold 110 may be fluidically coupled to first reservoir 200. In examples, the terms "couple," "coupled," "coupling," and/or "couples" are intended to include suitable indirect and/or direct connections. Thus, if a first component is described as being "fluidicaly coupled" to a second component, that coupling may be, for example, a direct or indirect connection to convey a fluid therebetween. In contrast, the terms "connect," "connection," or "connects" are intended to include direct connections. In the example of FIG. 1, purging manifold 110 may receive fluid from first reservoir 200 via fluid inlet port 150 and may supply fluid to first reservoir 200 via purging outlet port 140. In other words, a loop may be formed between purging manifold 110 and first reservoir 200 to distribute fluid therebetween.

In examples, first reservoir 200 may receive fluid from a container coupled thereto, such as a cartridge or container (not shown in FIG. 1). In such an example, first reservoir 200 may house or hold a larger volume of fluid than second reservoir 120 of purging manifold 110. For example, first reservoir 200 may hold a range of 10-1000 times (10×-1000×) greater fluid volume compared to purging manifold 110.

In operation, fluid entering purging manifold 110 through fluid inlet port 150 will fall under the force of gravity and/or an external pressure towards a bottom surface of second reservoir 120. In such examples, gas in the fluid may rise against the force of gravity towards a top surface of second reservoir 120 and may separate from liquid printing material therein. As such, second reservoir 120 may contain a liquid layer disposed relative to the bottom surface thereof and a gas layer disposed above the liquid layer, as discussed in further detail with respect to FIGS. 3A-3C. As used herein, "liquid printing material" may refer to a fluid of printing material from which some gases, such as air, have been at least partially separated and/or removed. In examples, liquid printing material may include some gas therein but the amount of gas therein may be less than the amount of gas in the fluid before a gas separation operation. In one such example, liquid printing material may include less gases than a fluid received via fluid inlet port 150.

In examples, fluid inlet port 150 may convey fluid to second reservoir 120 from first reservoir 200. In examples, the fluid received by purging manifold 110 from first reservoir 200 via fluid inlet port 150 may include a gas, such as air, in the form of air bubbles therein. In such examples, the gas in a fluid received by first reservoir 200 may be from various sources. In some examples, the fluid in a cartridge coupled to printing system 10 may have gas therein. In other examples, air may enter the fluid from fluid conduits (e.g., tubes) used to transport the fluid through printing system 10. In such examples, more air may enter the fluid as the fluid is transported longer and longer distances through printing system 10. In examples, fluid inlet port 150 may be disposed above supply port 130A.

In examples, purging outlet port 140 may be disposed above supply port 130A to convey fluid to first reservoir 200. In examples, purging outlet port 140 may convey excess fluid from second reservoir 120 to first reservoir 200. In examples, in operation, as more fluid enters second reservoir 120 more fluid may exit second reservoir 120 either through supply port 130A towards fluid ejection device 105 or through purging outlet port 140 towards first reservoir 200. In examples, purging outlet port 140 may convey fluid proximate to the purging outlet port 140 to first reservoir 200. In examples, any of a gas layer, a liquid layer, or a combination thereof may be disposed adjacent to purging outlet port 140 for conveyance to first reservoir 200. In such examples, purging outlet port 140 may convey fluid from a gas layer of the fluid in second reservoir 120 to first reservoir 200. In other such examples, purging outlet port 140 may convey fluid from a liquid layer of the fluid in second reservoir 120 to first reservoir 200. In yet other such examples, purging outlet port 140 may convey fluid from both a gas layer and a liquid layer of the fluid in second reservoir 120 to first reservoir 200. In other words, in some examples, purging outlet port 140 may convey a fluid including separated air (e.g., gas) from second reservoir 120 to first reservoir 200.

In examples, purging manifold 110 may fluidically couple to fluid ejection device 105. In some examples, purging manifold 110 may be coupled to fluid ejection device 105 via any fluid conduit or intermediate component(s) to form a filterless and a valveless fluid connection therewith. For example, purging manifold 110 may be fluidically coupled to fluid ejection device 105 via fluid interface connector 135. In such examples, purging manifold 110 may be fluidically connected to fluid interface connector 135, and fluid interface connector 135 may be fluidically connected to fluid ejection device 105. As used herein, the term "fluidicaly connected" may refer to a connection between components to convey fluid therebetween. In other examples, purging manifold 110 may be fluidically connected to fluid ejection device 105 via supply port 130A.

In examples, supply port 130A of purging manifold 110 may supply fluid from second reservoir 130A to fluid ejection device 105. In examples, supply port 130A may be disposed to supply fluid from a bottom portion of second reservoir 120. In examples, supply port 130A may supply fluid from a liquid layer of a fluid in second reservoir 120 to fluid ejection device 105. In such examples, the liquid layer may include liquid printing material to be dispensed by the fluid ejection device 105. Accordingly, in such examples, purging manifold 110 may facilitate the separation of a liquid from a gas in a fluid to supply liquid printing material to fluid ejection device 105.

In examples, purging manifold 110 is filterless and may facilitate the separation of a liquid from a gas. As used herein, the term "filterless" may refer to a state of not having a filter. Thus, if a component is described as filterless, the component does not have a filter therein. In examples, the use of purging manifold 110 in a printing system 10 may allow a filterless fluid connection and a valveless fluid connection to be formed with fluid ejection device 105. In the examples, the use of a purging manifold that is filterless to connect to a fluid ejection device forms a filterless fluid connection. Similarly, the use of a purging manifold that is valveless to connect to a fluid ejection device forms a valveless fluid connection. In examples described herein, the use of purging manifold 110 may reduce the amount of gas provided to the fluid ejection device and eliminate the usage of a separate filter or valve to control the amount of gas bubbles received by a fluid ejection device 105.

Figure 2:
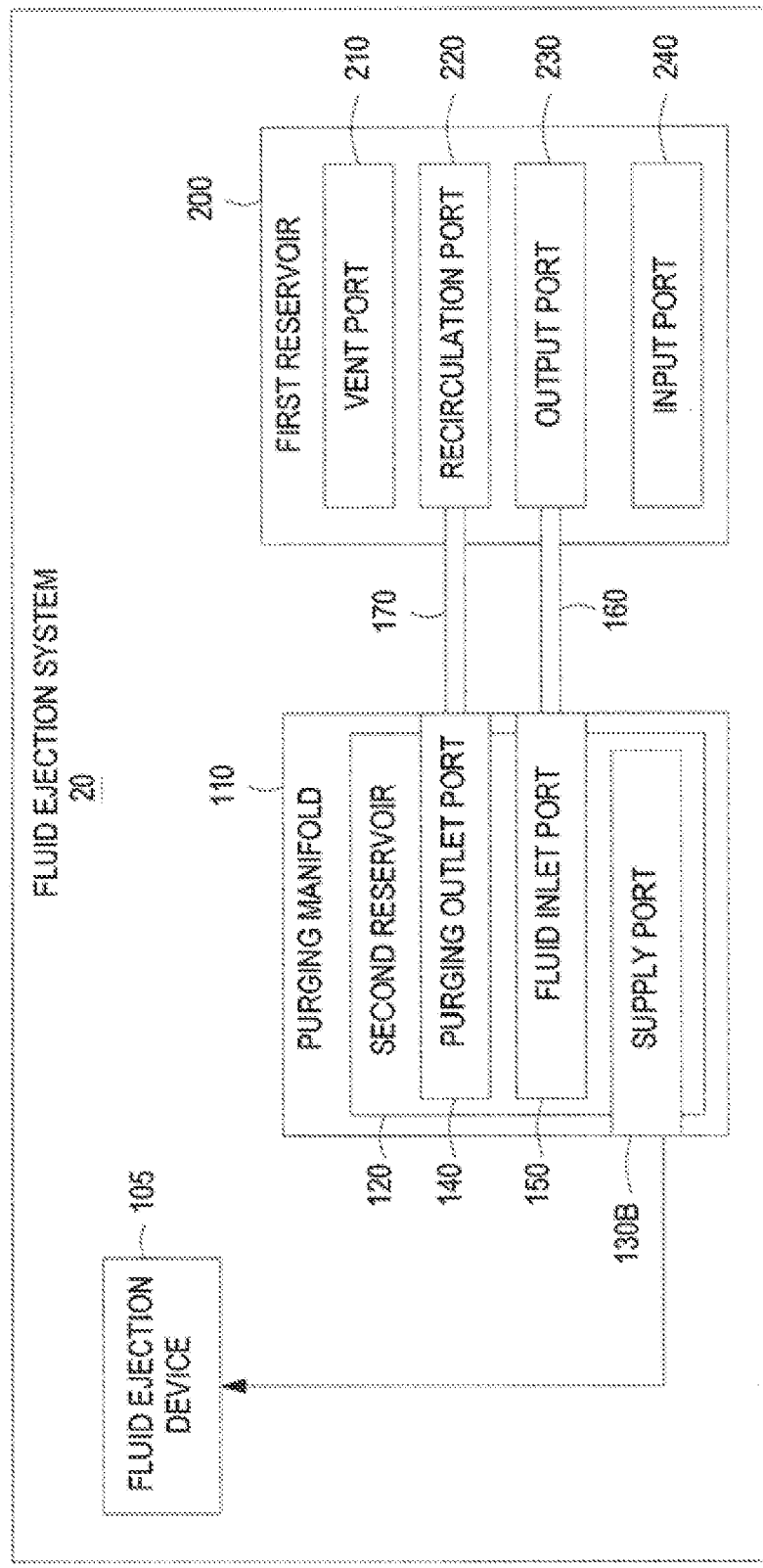
FIG. 2 is a block diagram of an example fluid ejection system.

FIG. 2 is a block diagram of some components of an example fluid ejection system. Example fluid ejection system 20 may include fluid ejection device 105, purging manifold 110, first reservoir 200, fluid conduit 160, and fluid conduit 170. The example fluid ejection device 105 includes nozzles through which fluids are dispensed. The example first reservoir 200 may be any chamber or reservoir to store, house, or hold a fluid. The example first reservoir 200 of FIG. 2 may include vent port 210, recirculation port 220, output port 230, and input port 240. The example purging manifold 110 includes a second reservoir 120, a supply port 130B, a purging outlet port 140, and a fluid inlet port 150.

In examples, purging manifold 110 may be fluidically coupled to first reservoir 200. In examples, fluid inlet port 150 may be coupled to output port 230 via fluid conduit 160. As used herein, a "fluid conduit" refers to any structure to convey fluid, such as tubes, channels, etc. In such examples, purging manifold 110 may receive fluid from first reservoir 200 and may also supply fluid to first reservoir 200. In examples, purging outlet port 140 may be coupled to recirculation port 220 via fluid conduit 170. In such examples, purging outlet port 140 may supply fluid to first reservoir 200. In other words, a loop may be formed between purging manifold 110 and first reservoir 200 to distribute fluid therebetween.

In examples, first reservoir 200 may receive fluid from a container coupled thereto, such as a cartridge or container (not shown in FIG. 2). In such an example, first reservoir 200 may house or hold a larger volume of fluid than second reservoir 120 of purging manifold 110. For example, first reservoir 200 may hold a range of 10-1000 times (10×-1000×) greater fluid volume compared to purging manifold 110.

In operation, in the example of FIG. 2, fluid entering purging manifold 110 through fluid inlet port 150 will fall under the force of gravity and/or an external pressure towards a bottom surface of second reservoir 120. In such examples, gas in the fluid may rise against the force of gravity towards a top surface of second reservoir 120 and may separate from liquid printing material therein. As such, second reservoir 120 may contain a liquid layer disposed on the bottom surface thereof and a gas layer disposed above the liquid layer.

In examples, fluid inlet port 150 may be fluidically coupled to output port 230 of first reservoir 200 to convey fluid to second reservoir 120 from first reservoir 200. In examples, the fluid received by purging manifold 110 from first reservoir 200 via fluid inlet port 150 may include a gas, such as air in the form of air bubbles therein. In examples, fluid inlet port 150 may be disposed above supply port 130B.

In examples, purging outlet port 140 may be fluidically coupled to recirculation port 220 of first reservoir 200 to convey fluid to first reservoir 200 from second reservoir 120 via fluid conduit 170. In examples, purging outlet port 140 may be disposed above supply port 130B to convey fluid to first reservoir 200. In examples, purging outlet port 140 may convey excess fluid from second reservoir 120 to first reservoir 200. In examples, in operation, as more fluid enters second reservoir 120 more fluid may exit second reservoir 120 either through supply port 130B towards fluid ejection device 105 or through purging outlet port 140 towards first reservoir 200. In examples, purging outlet port 140 may convey fluid disposed adjacent to the purging outlet port 140 to first reservoir 200. In examples, any of a gas layer, a liquid layer, or a combination thereof may be disposed adjacent to purging outlet port 140 for conveyance to first reservoir 200. In such examples, purging outlet port 140 may convey fluid from a gas layer of the fluid in second reservoir 120 to first reservoir 200. In other examples, purging outlet port 140 may convey fluid from a liquid layer of the fluid in second reservoir 120 to first reservoir 200. In yet other examples, purging outlet port 140 may convey fluid from both a gas layer and a liquid layer of the fluid in second reservoir 120 to first reservoir 200. In other words, in some examples, purging outlet port 140 may convey a fluid including separated air (e.g., gas) from second reservoir 120 to first reservoir 200.

In examples, supply port 130B of purging manifold 110 may fluidically connect to fluid ejection device 105. In examples, supply port 130B may be disposed to supply fluid from a bottom portion of second reservoir 120. In examples, supply port 130B may supply fluid from a liquid layer of a fluid in second reservoir 120 to fluid ejection device 105. In such examples, the liquid layer may include liquid printing material to be dispensed by the fluid ejection device 105. In such examples, purging manifold 110 may facilitate the separation of a liquid from a gas in a fluid to supply liquid printing material to fluid ejection device 105. In the example of FIG. 2, supply port 130B may include a fluid interface connector to connect to fluid ejection device 105. In one such example, the fluid interface connector may be a needle/septum interface as described below with respect to FIG. 7-9.

In examples, vent port 210 may communicate with an atmosphere. In an example, vent port 210 of first reservoir 200 may provide an opening to an atmosphere to vent a content of first reservoir 200. In examples, vent port 210 may be disposed on a top surface of first reservoir 200. In some examples, vent port 210 may be an opening in the top surface of first reservoir 200 to vent to an environment inside fluid ejection system 20. In other examples, vent port 210 may be a structure to provide a path for a fluid in first reservoir 200 to communicate with an environment outside fluid ejection system 20. In examples, a fluid in first reservoir 200 may separate into a liquid layer and a gas layer as discussed above with respect to second reservoir 120. In such examples, vent port 210 may vent gas from a gas layer to the atmosphere.

In examples, recirculation port 220 may receive a fluid from purging manifold 110. In examples, recirculation port 220 of first reservoir 200 may be fluidically coupled to purging outlet port 140 of purging manifold 110 via fluid conduit 170. In examples, recirculation port 220 may receive fluid from purging outlet port 140. In one such examples, recirculation port 220 may receive fluid from a gas layer of fluid in second reservoir 120 of purging manifold 110. In such an example, some of the fluid (i.e., a gas therein) received from purging manifold 110 by first reservoir 200 may be vented to the atmosphere via vent port 210. In another example, recirculation port 220 may receive fluid from a liquid layer of a fluid containing liquid printing material in second reservoir 120 of purging manifold 110. In such an example, fluid received from purging manifold 110 may fall under the force of gravity towards a bottom layer of first reservoir 200 thereby pushing or displacing any fluid already in first reservoir 200 upwards towards vent port 210. In one such example, the fluid displaced by fluid received by recirculation port 220 from second reservoir 120 may be from a gas layer in first reservoir 200. In another example, the fluid displaced by fluid received by recirculation port 220 from second reservoir 120 may be from a liquid layer in first reservoir 200. In an example, recirculation port 220 may receive fluid from a gas layer and a liquid layer of fluid in second reservoir 120 of purging manifold 110. Hence, recirculation port 220 may receive fluid to be purged from second reservoir 120, such as, a gas or a liquid therein.

In examples, input port 240 may receive a fluid. In some examples, input port 240 may receive a fluid from another component coupled to fluid ejection system 20. For examples, input port 240 may receive a fluid from a cartridge or container (not shown in FIG. 2), such as a printing material. In operation, input port 240 may receive fluid when fluidically coupled to another component. Any number of intermediate components may be used to convey fluid between input port 240 and the other component, such as pumps, valves, fluid conduits, etc.

In examples, output port 230 may supply fluid from the first reservoir 200. In some examples, output port 230 of first reservoir 200 may be fluidically coupled to fluid inlet port 150 of purging manifold 110 via fluid conduit 160. In examples output port 230 may supply fluid from first reservoir 200 to fluid inlet port 150. In such an example, the fluid supplied from first reservoir 200 to purging manifold 110 may include gases therein. Moreover, examples including purging manifolds similar to the example purging manifolds described herein may at least partially degasify fluids before such fluids are supplied to fluid ejection devices thereof. As will be appreciated, the use of purging manifold 110 to provide separate liquid printing material from gases in a fluid allows other components of fluid ejection system 20 to be designed without gas or air reduction mechanisms incorporated therein. As such, in the example of FIG. 2, fluid conduit 160 and fluid conduit 170 may be any type of fluid conduit to convey fluid. In some examples, fluid conduit 160 and fluid conduit 170 may be composed of a flexible material, such as a thermoplastic elastomer (TPE) such as SANTOPRENE®, polychlorinated biphenyl (PCB), polyolefin, etc. In some examples, fluid conduit 160 and fluid conduit 170 may be composed of an air penetrable material.

Figure 3B:
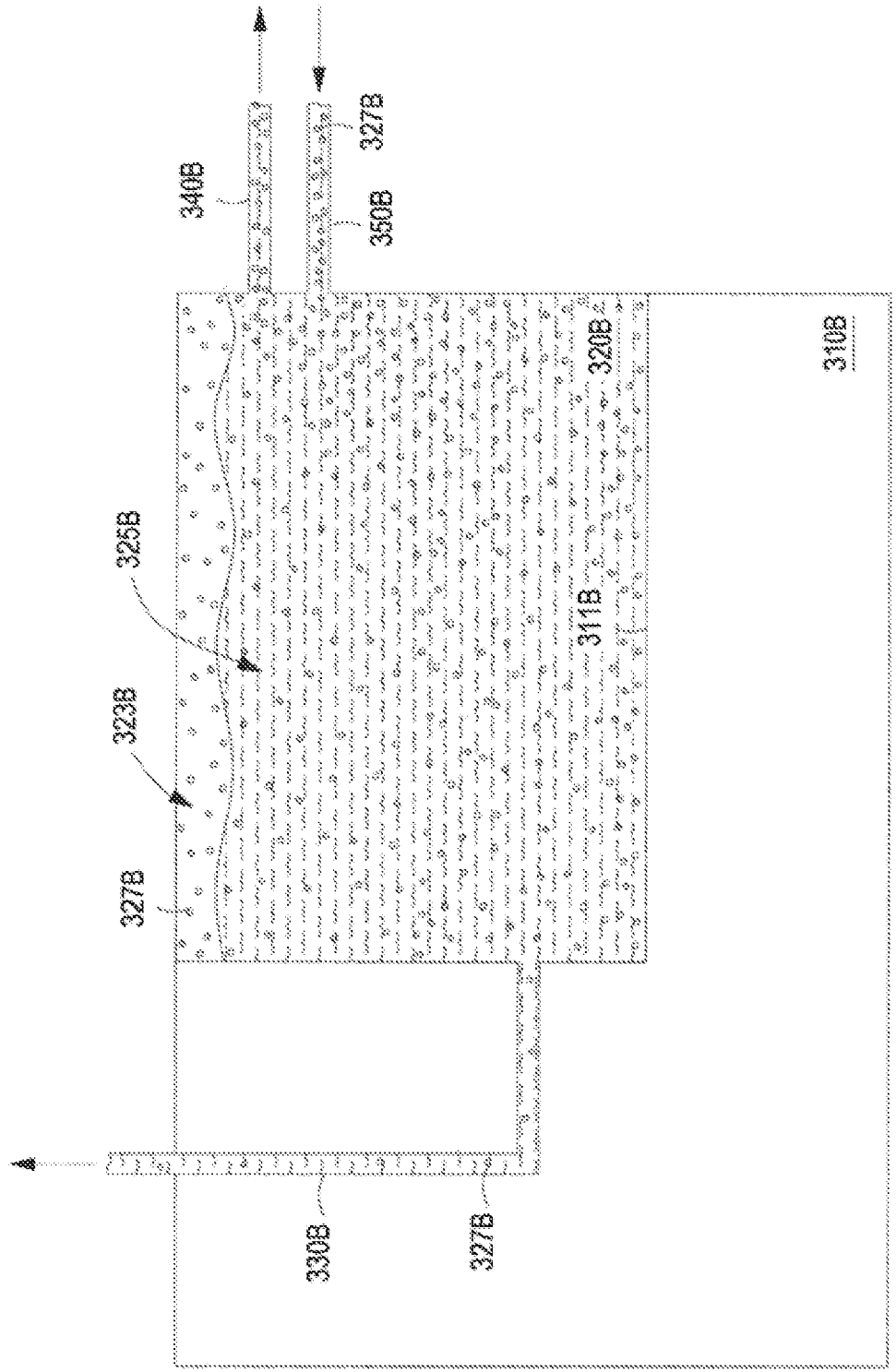
Figure 3C:
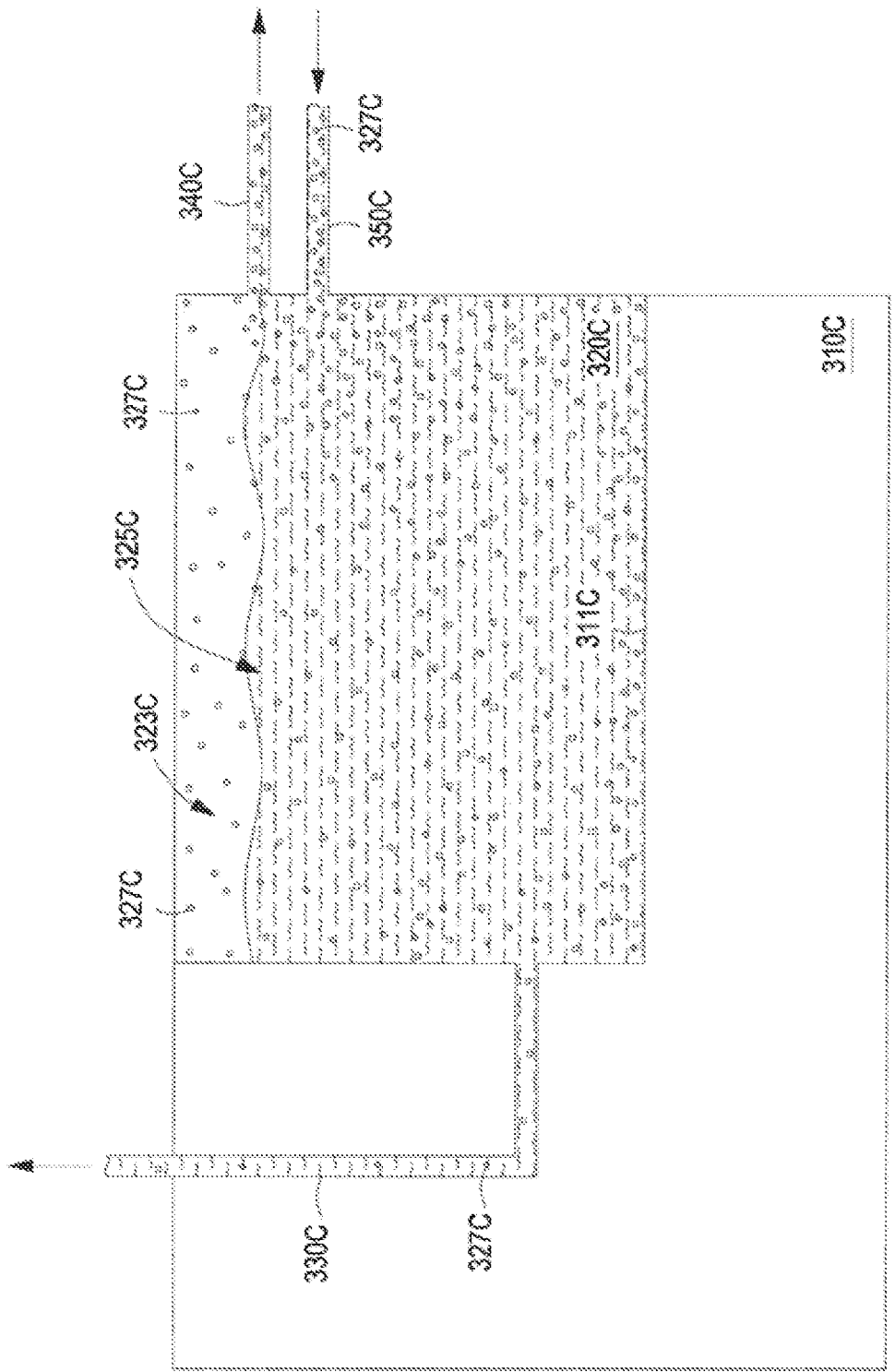

FIGS. 3A-3C are block diagrams of some components of an example purging manifold. FIGS. 3A-3C illustrate examples of purging manifolds in operation receiving and conveying fluids. In FIG. 3A, the example purging manifold 310A includes a second reservoir 320A, a supply port 330A, a purging outlet port 340A, and a fluid inlet port 350A. In the example of FIG. 3A, a fluid is disposed in second reservoir 320A. The fluid of reservoir 320A has separated into a gas layer 323A and a liquid layer 325A. In examples, the liquid layer 325A may include liquid printing material and some air or gas bubbles 327A therein. As will be appreciated, gas bubbles 327A in a liquid will rise towards the top of the liquid against the force of gravity to form or join a gas layer 323A. In examples, the longer a fluid sits in the second reservoir 320A the more gas (i.e., air) will separate from liquid to form gas layer 323A and liquid layer 325A.

In examples, supply port 330A is disposed proximate a bottom surface 311A of second reservoir 320A to convey fluid proximate to supply port 330A to a fluid ejection device (not shown in FIG. 3A). In some examples, supply port 330A may be fluidically coupled to the fluid ejection device via intermediate components to form a filterless or valveless coupling therewith. In other examples, supply port 330A may be fluidically connected to the fluid ejection device to provide fluid from a liquid layer 325A to the fluid ejection device connected thereto. As will be appreciated, as gas separates from liquid and rises towards a top of second reservoir 320A, the fluid at the top of second reservoir 320A may have a higher concentration of gases therein compared to fluid proximate supply port 330A and proximate the bottom surface 311A. Accordingly, a fluid conveyed by supply port 330A to a fluid ejection device may be described as at least partially degasified fluid.

In examples, fluid inlet port 350A is disposed above supply port 330A to supply a fluid to second reservoir 320A from another reservoir (e.g., first reservoir 200 of FIGS. 1-2). In the example of FIG. 3A, the fluid received via fluid inlet port 350A is depicted as including gases therein. As will be appreciated, fluid conduit 350A may convey a fluid including a liquid and a gas therein to second reservoir 320A.

In examples, purging outlet port 340A is disposed above supply port 330A to covey a fluid from second reservoir 320A to another reservoir (e.g., first reservoir 200 of FIGS. 1-2). As will be appreciated, a fluid conveyed by purging outlet port 340A may have a higher concentration of gas therein as compared to fluid conveyed by supply port 330A. In the example of FIG. 3A, liquid layer 325A is disposed below purging outlet 340A. In such an example, purging outlet 340A may convey fluid from gas layer 323A to another reservoir. In other words, purging outlet port 340A may convey a fluid including separated air (e.g., gas) from second reservoir 320A to another reservoir.

In FIG. 3B, an example purging manifold 310B includes a second reservoir 320B with a bottom surface 311B, a supply port 330B, a purging outlet port 340B, and a fluid inlet port 350B. In the example of FIG. 3B, a fluid is disposed in second reservoir 320B. The fluid of reservoir 320B has separated into a gas layer 323B and a liquid layer 325B. In examples, liquid layer 325B may include liquid printing material and some air or gas bubbles 327B therein. As will be appreciated, gas bubbles 327B in a liquid will rise towards the top of the liquid against the force of gravity to form or join a gas layer 323B. In the example of FIG. 3B, liquid layer 325B is above purging outlet 340B. In such an example, purging outlet 340B may convey fluid from liquid layer 325B to another reservoir. In other words, purging outlet 340B may convey a fluid including liquid printing material from second reservoir 320B to another reservoir.

In examples, supply port 330B is disposed proximate bottom surface 311B of second reservoir 320B to convey fluid adjacent to supply port 330B to a fluid ejection device (not shown in FIG. 3B). In some examples, supply port 330B may be fluidically coupled to the fluid ejection device via intermediate components to form a filterless or valveless coupling therewith. In other examples, supply port 330B may be fluidically connected to the fluid ejection device to provide fluid from a liquid layer 325B to the fluid ejection device connected thereto. As will be appreciated, as gas separates from liquid and rises towards a top of second reservoir 320B, the fluid at the top of second reservoir 320B may have a higher concentration of gases therein compared to fluid proximate supply port 330B and proximate the bottom surface 311B. Accordingly, a fluid conveyed by supply port 330B to a fluid ejection device may be described as at least partially degasified fluid.

In examples, fluid inlet port 350B is disposed above supply port 330B to supply a fluid to second reservoir 320 from another reservoir (e.g., first reservoir 200 of FIGS. 1-2). As will be appreciated, a fluid conveyed by purging outlet port 340A may have a higher concentration of gas therein as compared to fluid conveyed by supply port 330B. In the example of FIG. 3B, the fluid received via fluid inlet port 350B is depicted as including both liquid and gases therein. As will be appreciated, in other examples, fluid conduit 350B may convey a fluid including either a liquid or a gas therein to second reservoir 320B.

In FIG. 3C, an example purging manifold 310C includes a second reservoir 320C with a bottom surface 311C, a supply port 330C, a purging outlet port 340C, and a fluid inlet port 350C. In the example of FIG. 3C, liquid layer 325C is disposed partially above purging outlet 340C. In the example of FIG. 3C, a fluid is disposed in second reservoir 320C. The fluid of reservoir 320C has separated into a gas layer 323C and a liquid layer 325C. In examples, liquid layer 325C may include liquid printing material and some air or gas bubbles 327C therein. As will be appreciated, gas bubbles 327C in a liquid will rise towards the top of the liquid against the force of gravity to form or join a gas layer 323C. In the example of FIG. 3C, purging outlet 340C may convey fluid from either or both of gas layer 323C and liquid layer 325C to another reservoir. In other words, purging outlet 340C may convey a fluid including separated gas (e.g., air) and liquid printing material from second reservoir 320C to another reservoir.

In examples, supply port 330C is disposed proximate bottom surface 311C of second reservoir 320C to convey fluid adjacent to supply port 330C to a fluid ejection device (not shown in FIG. 3C). In some examples, supply port 330C may be fluidically coupled to the fluid ejection device via intermediate components to form a filterless or valveless coupling therewith. In other examples, supply port 330C may be fluidically connected to the fluid ejection device to provide fluid from a liquid layer 325C to the fluid ejection device connected thereto. As will be appreciated, as gas separates from liquid and rises towards a top of second reservoir 320C, the fluid at the top of second reservoir 320C may have a higher concentration of gases therein compared to fluid proximate supply port 330C and proximate the bottom surface 311C. Accordingly, a fluid conveyed by supply port 330C to a fluid ejection device may be described as at least partially degasified fluid.

In examples, fluid inlet port 350C is disposed above supply port 330C to supply a fluid to second reservoir 320C from another reservoir (e.g., first reservoir 200 of FIGS. 1-2). As will be appreciated, a fluid conveyed by purging outlet port 340A may have a higher concentration of gas therein as compared to fluid conveyed by supply port 330A. In the example of FIG. 3C, the fluid received via fluid inlet port 350C is depicted as including both liquid and gases therein. As will be appreciated, in other examples, fluid conduit 350C may convey a fluid including either a liquid or a gas therein to second reservoir 320C.

As will be appreciated in the examples of FIGS. 3A-3C, the use of a purging manifold may reduce the volume of gas in a fluid provided to a fluid ejection device. In some examples, a sensor disposed to detect bubbles entering a fluid ejection device has observed a reduction in the amount of bubbles that is greater than tenfold (10×) in a printing system including a purging manifold compared to a printing system not using a purging manifold.

Figure 4A:
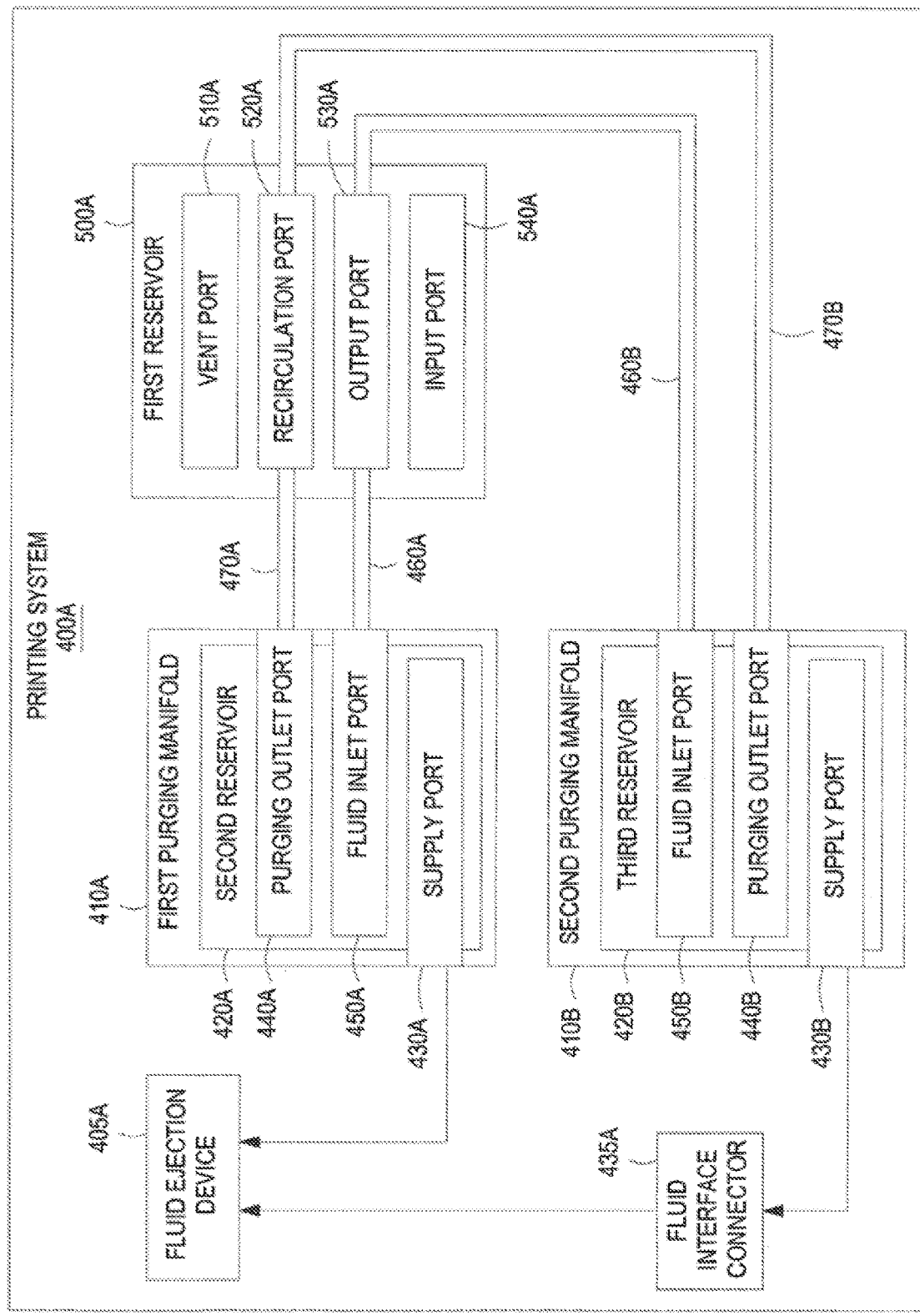
FIGS. 4A and 4B are block diagrams of some components of an example printing system.

FIG. 4A is block diagrams of some components of an example printing system 400A. Example printing system 400A may include a fluid ejection device 405A, a first purging manifold 410A, a second purging manifold 410B, and first reservoir 500A. In examples, first reservoir 500A may include vent port 510A, recirculation port 520A, output port 530A, and input port 540A. First reservoir 500A may be substantially similar to first reservoir 200 and additional description thereof will be omitted.

In examples, first purging manifold 410A includes a second reservoir 420A. Second reservoir 420A may include a supply port 430A, a purging outlet port 440A, and a fluid inlet port 450A. In examples, second reservoir 420A is coupled to first reservoir 500 via fluid conduit 460A and fluid conduit 470A. In examples, second reservoir 420A is coupled to fluid ejection device 405A via supply port 430A. In the example of FIG. 4A, fluid ejection device 405A is fluidically connected to supply port 430A. In such examples, supply port 430A may include a fluid interface connector.

In examples, second purging manifold 410B includes a third reservoir 420B. Third reservoir 420B may include a supply port 430B, a purging outlet port 440B, and a fluid inlet port 450B. In examples, third reservoir 420B is coupled to first reservoir 500 via fluid conduit 460B and fluid conduit 470B. In the example of FIG. 4A, second purging manifold 410B is fluidically coupled to fluid ejection device 405A via supply port 430B and fluid interface connector 435A. In such examples, third reservoir 420B is coupled to fluid ejection device 405A via supply port 430B at a different location than second reservoir 420A is connected to fluid ejection device 405A. In such an example, fluid from first reservoir 500 may be provided to different locations of fluid ejection device 405A. In operation, fluid from first reservoir 500 may be conveyed to first purging manifold 410A via fluid conduit 460A and to second purging manifold 410A via fluid conduit 460B. In operation, in second reservoir 420A and third reservoir 420B some gas from a fluid therein may separate into a gas layer and a liquid layer. In examples, second reservoir 420A and third reservoir 420B may provide liquid printing material to fluid ejection device 405A via supply port 430A and supply port 430B, respectively. In the example of FIG. 4A, the same fluid is provided to second reservoir 420A and third reservoir 420B and therefore the same liquid printing material may be provided to fluid ejection device 405A by first purging manifold 410A and second purging manifold 410B.

Figure 4B:
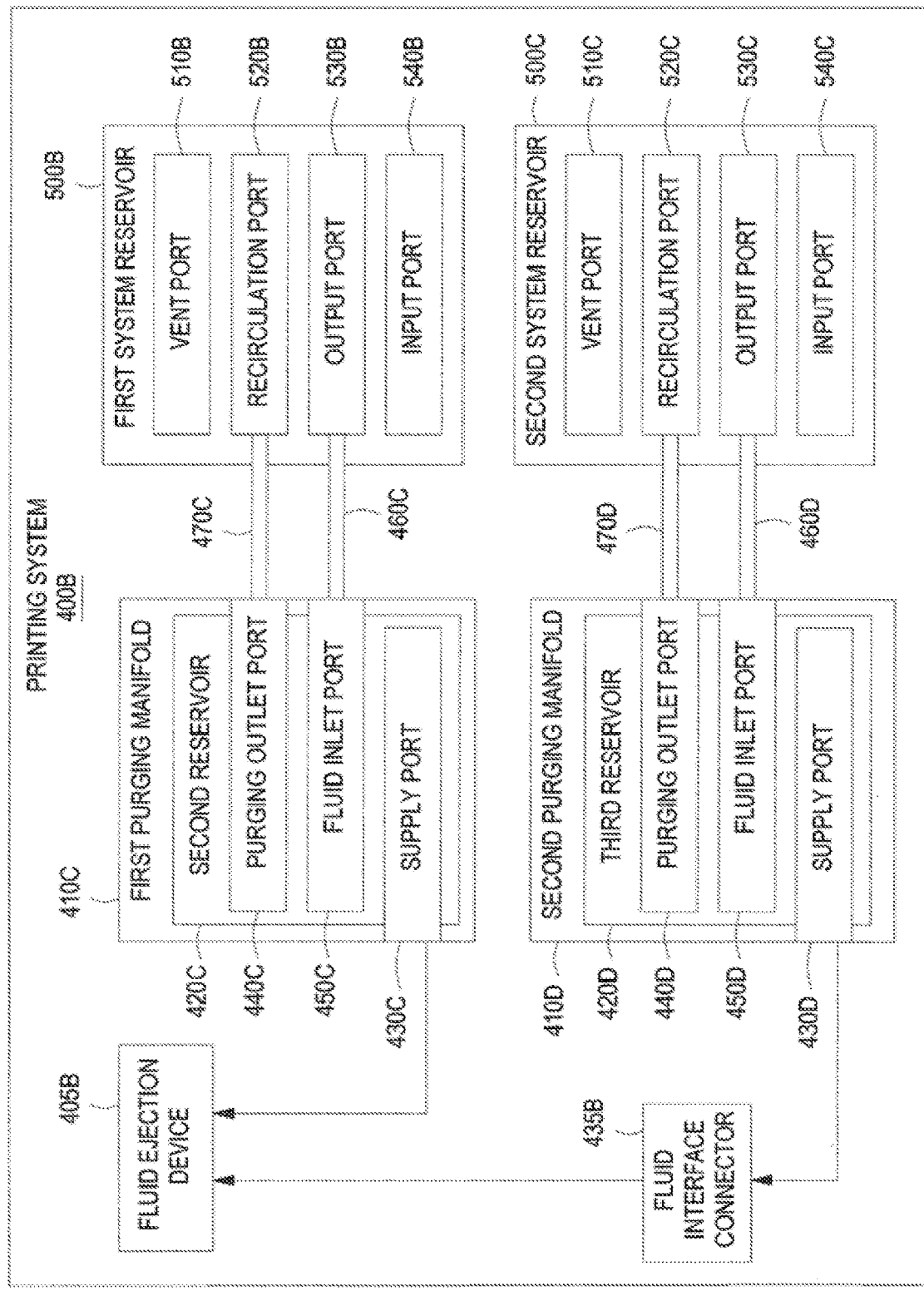

FIG. 4B is block diagrams of some components of an example printing system 400B. Example printing system 400B may include a fluid ejection device 405B, a first purging manifold 410C, second purging manifold 410D, first system reservoir 500B, second system reservoir 500C, and fluid interface connector 435B. In examples, first system reservoir 500B may include vent port 510B, recirculation port 520B, output port 530B, and input port 540B. In examples, second system reservoir 500C may include vent port 510C, recirculation port 520C, output port 530C, and input port 540C. First system reservoir 500B and second system reservoir 500C may be substantially similar to first reservoir 200 and additional descriptions thereof will be omitted. In the example of FIG. 4B, first system reservoir 500B and second system reservoir 500C may receive the same fluid or different fluid. The fluid may be different types of printing materials. For example, first system reservoir 500B may receive a colorant and second system reservoir 500C may receive a detailing agent.

In examples, second purging manifold 410B includes a second reservoir 420C. Second reservoir 420C may include a supply port 430C, a purging outlet port 440C, and a fluid inlet port 450C. In examples, second reservoir 420C is coupled to first system reservoir 500B via fluid conduit 460C and fluid conduit 470C. In examples, second reservoir 420B is coupled to fluid ejection device 405B via supply port 430C. In the example of FIG. 4B, fluid ejection device 405B is fluidically connected to supply port 430C. In such examples, supply port 430C may include a fluid interface connector.

In examples, second purging manifold 410D includes a third reservoir 420D. Third reservoir 430D may include a supply port 430D, a purging outlet port 440D, and a fluid inlet port 450D. In examples, third reservoir 420D is coupled to second system reservoir 5000 via fluid conduit 460D and fluid conduit 470D. In the example of FIG. 4B, second purging manifold 410D is fluidically coupled to fluid ejection device 405B via supply port 430D and fluid interface connector 435B. In such examples, third reservoir 420D is coupled to fluid ejection device 4056 via supply port 430D at a different location than second reservoir 420C is connected to fluid ejection device 405B. In operation, fluid from second system reservoir 500C may be conveyed to second reservoir 420C of first purging manifold 410B via fluid conduit 460C. Similarly, in operation, fluid from first reservoir 500D may be conveyed to third reservoir 420D of second purging manifold 410B via fluid conduit 460D. In the example of FIG. 4B, second reservoir 420B and third reservoir 420D may receive the same fluid or different fluid. The fluid may be different types of printing materials. For example, second reservoir 420B may receive a colorant and third reservoir 420D may receive a detailing agent.

In operation, in second reservoir 420C and third reservoir 420D some gas from a fluid therein may separate into a gas layer and a liquid layer. In examples, second reservoir 420C and third reservoir 420D may provide liquid printing material to fluid ejection device 405B via supply port 430C and supply port 430D, respectively. In the example of FIG. 4B, different fluid may be provided to second reservoir 420C and third reservoir 420D and therefore different liquid printing material may be provided to fluid ejection device 405B by first purging manifold 410C and second purging manifold 410D. For example, first purging manifold 410C may convey a colorant to fluid ejection device 405B and second purging manifold 410D may convey a fusing agent to fluid ejection device 405B.

Figure 5:
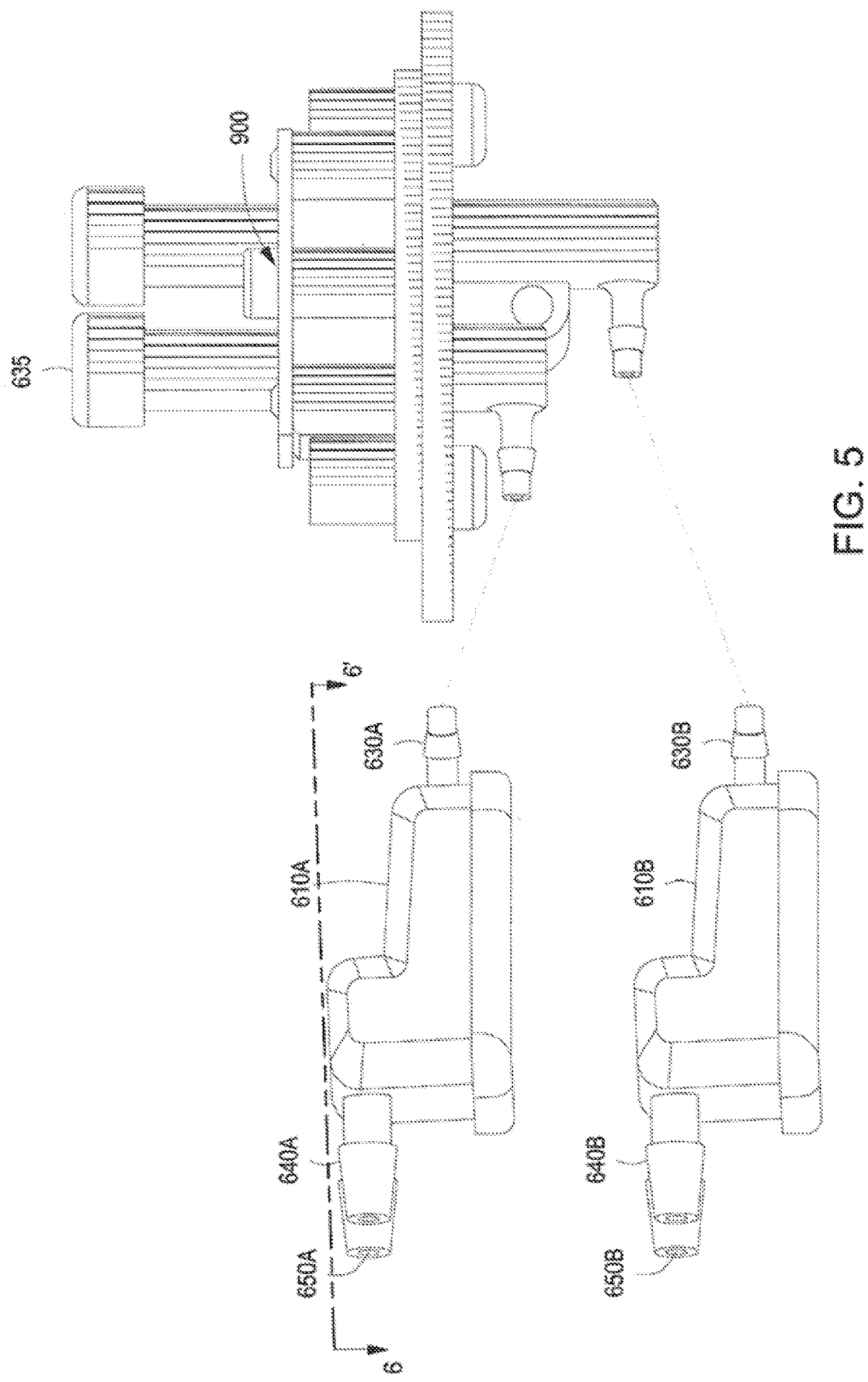
FIG. 5 is an exploded view of example purging manifolds and a fluid interface connector.
Figure 6:
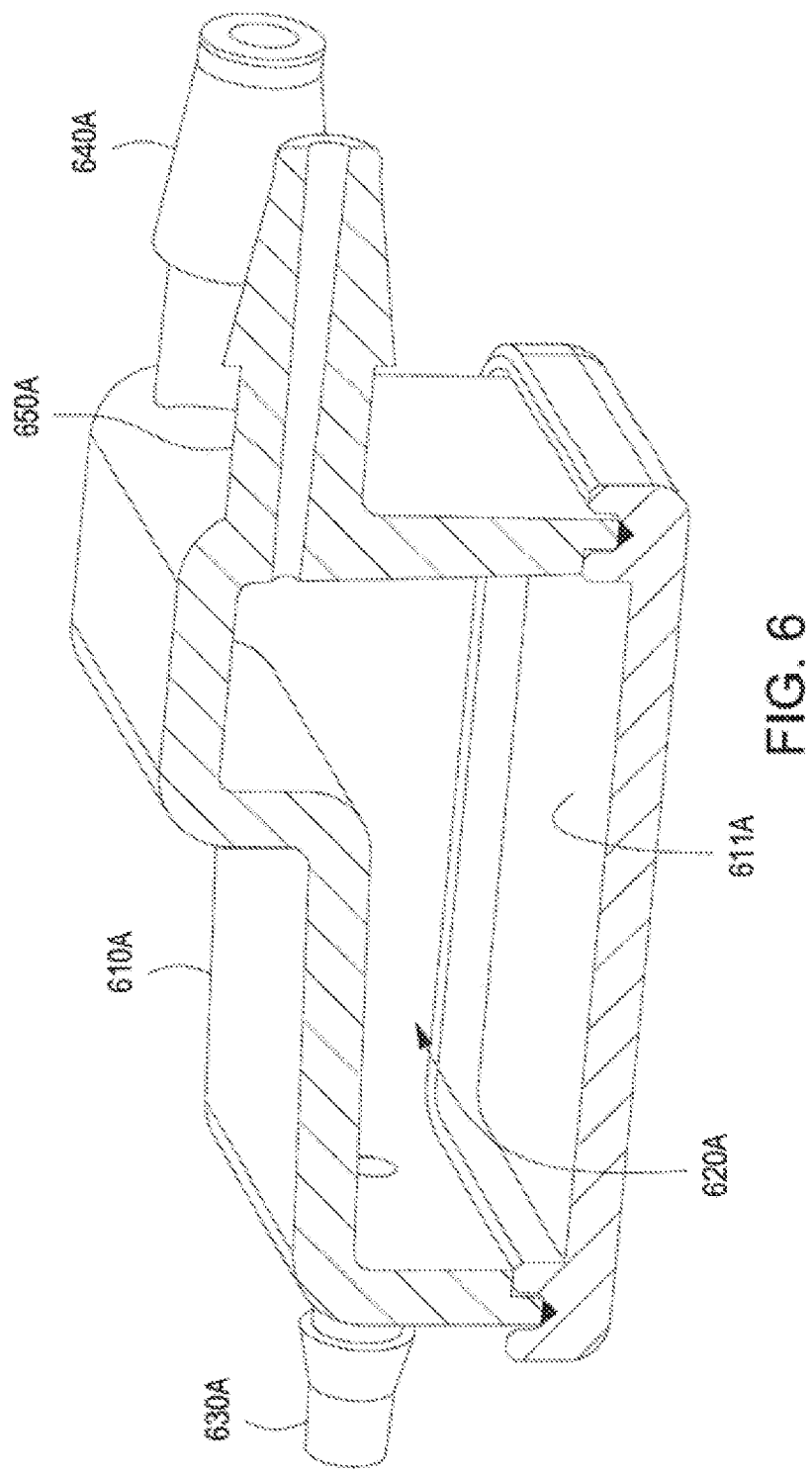
FIG. 6 is a side cross-sectional view of a portion of a purging manifold of FIG. 5 taken along line 6-6'.

FIG. 5 is an exploded view of example purging manifolds and a fluid interface connector. In the example of FIG. 5, a first purging manifold 610A and a second purging manifold 610B are depicted along with a fluid interface connector 635. FIG. 6 a side cross-sectional view of a portion of a purging manifold of FIG. 5 taken along line 6-6'. Referring to FIGS. 5 and 6, in examples, first purging manifold 610A includes a first reservoir 620A, a first supply port 630A, a first purging outlet port 640A, and a first fluid inlet port 650A. In examples, second purging manifold 610B includes a second reservoir 620B, a second supply port 630B, a second purging outlet port 640B, and a second fluid inlet port 650B. In some examples, first reservoir 620A and second reservoir 620B may receive different fluids. For examples, when coupled to a printing system, first reservoir 620A and second reservoir 620B may receive printing materials.

In the example of FIGS. 5-6, first reservoir 620A of first purging manifold 610A may house or store a first fluid therein. In examples, first reservoir 620A may receive the first fluid from another component in a printing system (not shown). In such an example, the first fluid may be a printing material. In operation, the first fluid may separate into a gas layer and a liquid layer in first reservoir 620A.

In examples, a first supply port 630A of first purging manifold 610A may supply the first fluid from first reservoir 620A to another component (e.g., a fluid ejection device) via fluid first interface connector 635. In some examples, fluid interface connector 635 may be connected to first supply port 630A. In other examples, fluid interface connector 635 may be coupled to first supply port 630A via an intermediate member, such as a fluid conduit. In examples, first supply port 630A is proximate a bottom surface 611A of first reservoir 620A along the force of gravity and/or an external pressure on first reservoir 620A to supply a fluid adjacent thereto. In such example, first supply port 630A may supply a liquid printing material of the first fluid to a component coupled thereto.

In examples, first purging outlet port 640A of first purging manifold 610A may convey the first fluid from first reservoir 620A to another component (e.g., another reservoir). As shown, first purging outlet port 640A is disposed above first supply port 630A to convey a fluid adjacent thereto. In such examples, first purging outlet port 640A may convey the first fluid from any of a gas layer, a liquid layer, or a combination thereof to another component.

In examples, first fluid inlet port 650A of first purging manifold 610A may convey the first fluid to first reservoir 620A. As shown, first fluid inlet port 650A is disposed above first supply port 630A to convey first fluid to first reservoir 620A. In examples, when coupled to a printing system, first fluid inlet port 650A and first purging outlet port 640A may form a loop with another reservoir to distribute fluid therebetween. In such examples, fluid entering first reservoir 620A may separate into a gas layer and a liquid layer and first supply port 630A may provide fluid from a liquid layer to a fluid ejection device (not shown) coupled or connected thereto.

In the example of FIGS. 5-6, second reservoir 620B of second purging manifold 610 may house or store a second fluid therein. In examples, second reservoir 620B may receive the second fluid from another component in a printing system (not shown). In such an example, the second fluid may be a printing material. In operation, the second fluid may separate into a gas layer and a liquid layer in second reservoir 620A.

In examples, a second supply port 630B of second purging manifold 610B may supply the second fluid from second reservoir 620B to another component (e.g., a fluid ejection device) via fluid interface connector 635. In some examples, fluid interface connector 635 may be connected to second supply port 630B. In other examples, fluid interface connector 635 may be coupled to second supply port 630B via an intermediate member, such as a fluid conduit. In examples, second supply port 630B is proximate a bottom surface (not shown) of second reservoir 620B along the force of gravity and/or an external pressure on second reservoir 620B to supply a fluid adjacent thereto. In such example, second supply port 630B may supply a liquid printing material of the second fluid to a component coupled thereto.

In examples, second purging outlet port 640B of second purging manifold 610B may convey the second fluid from reservoir 620B to another component (e.g., another reservoir). As shown, second purging outlet port 640B is disposed above second supply port 630B to convey a fluid adjacent thereto. In such examples, second purging outlet port 640B may convey the second fluid from any of a gas layer, a liquid layer, or a combination thereof to another component.

In examples, second fluid inlet port 650B of second purging manifold 610B may convey the second fluid to reservoir 620A. As shown, second fluid inlet port 650B is disposed above second supply port 630B to convey second fluid to second reservoir 620A. In examples, when coupled to a printing system, second fluid inlet port 650B and second purging outlet port 640B may form a loop with another reservoir to distribute fluid therebetween. In such examples, fluid entering second reservoir 620B may separate into a gas layer and a liquid layer and second supply port 630B may provide fluid from a liquid layer to a fluid ejection device coupled or connected thereto.

In examples, in operation, the use of first purging manifold 610A and second purging manifold 610B may eliminate the usage of filters, valves, or other bubble reduction mechanisms in a printing system. Furthermore, such printing systems may be able to use more cost-effective fluid conduits which may be more flexible and less air impenetrable to reduce a footprint of a printing systems.

Figure 7:
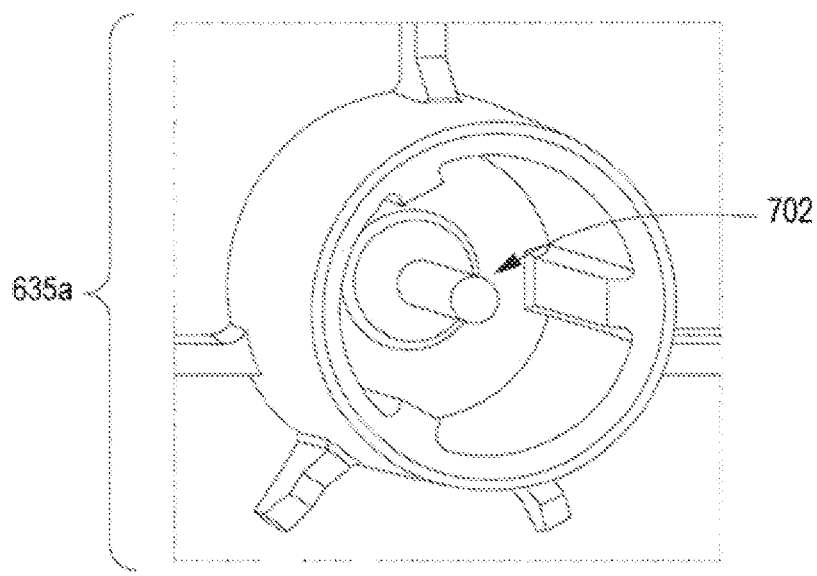
FIG. 7 is a perspective view of an example of a fluid interface member that includes a needle of the fluid interface connector of FIG. 5.
Figure 8:
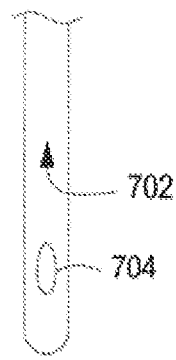
FIG. 8 illustrates an example of a needle of a fluid interface member of FIG. 7.
Figure 9:
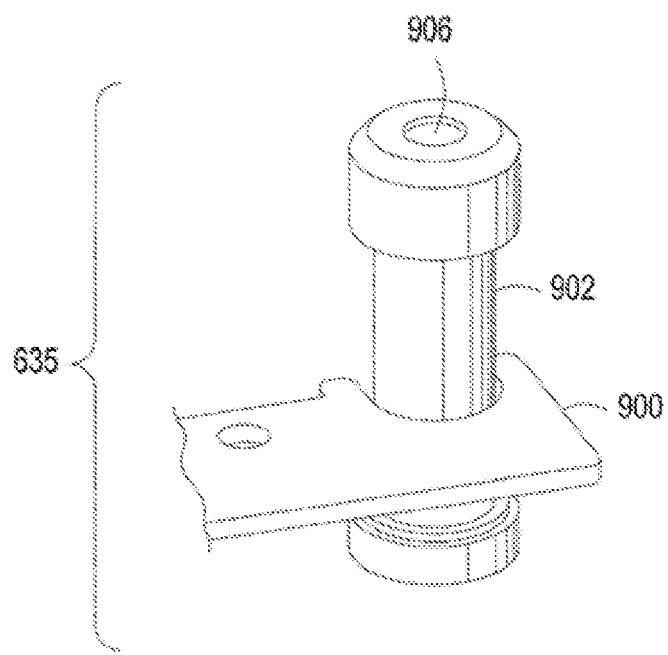
FIG. 9 is a perspective view of an example of a fluid interface connector mounted on a port of a printing system.

FIG. 7 is a perspective view of an example of a fluid interface member 635a that includes a needle of fluid interface connector 635 of FIG. 5. FIG. 8 illustrates an example of a needle of fluid interface member 635a of FIG. 7. FIG. 9 is a perspective view of an example of fluid interface connector 635 mounted on a port of a printing system. Referring to FIGS. 5 and 7-9, fluid interface connector 635 may couple to and/or connect to first supply port 630A and second supply port 630B. In such examples, in a printing system, fluid interface connector 635 may connect to a fluid ejection device to provide fluid thereto.

The fluid interface member 635a includes a needle 702. As used here, a "needle" may refer to an elongated member that can engage with another structure, such as a structure of a fluid interface connector 635. As shown in FIG. 8, the needle 702 has a side opening 704 (or alternatively, multiple side openings 704) to allow for a gas or liquid to enter through the side opening(s) 704 and into an inner channel of the needle 702.

In FIG. 8, in examples, fluid interface connector 635 is attached to a support frame 900 for coupling to a port of a purging manifold. In examples, fluid interface connector 635 includes a housing 902 with an inlet 906. Although depicted as a cylindrical, housing 902 may have different shapes.

In some examples, the inlet 906 is in the form of a septum. In such examples, the septum has a slit that allows needle 702 to pass through the septum and into an inner chamber of the housing 902 of the fluid interface connector 635. In examples, the septum can be formed of a polymer (e.g., polyisoprene) or other material that allows for the inlet 906 to be a re-closable inlet. In examples, re-closable inlet 906 when pierced by needle 702 allows for the needle 702 to extend into the inner chamber of the housing 902 of fluid interface connector 635 to establish a fluid communication between needle 702 and fluid interface connector 635. As used herein, a needle/septum interface, refers to fluid interface connector with a needle and septum to provide a re-closeable fluid connection. In example, fluid interface connector 635 may provide a re-closeable fluid connection to a fluid ejection device of a printing system which may reduce the introduction of air into the fluid ejection device if purging manifolds are uncoupled from the fluid ejection device.

Figure 10:
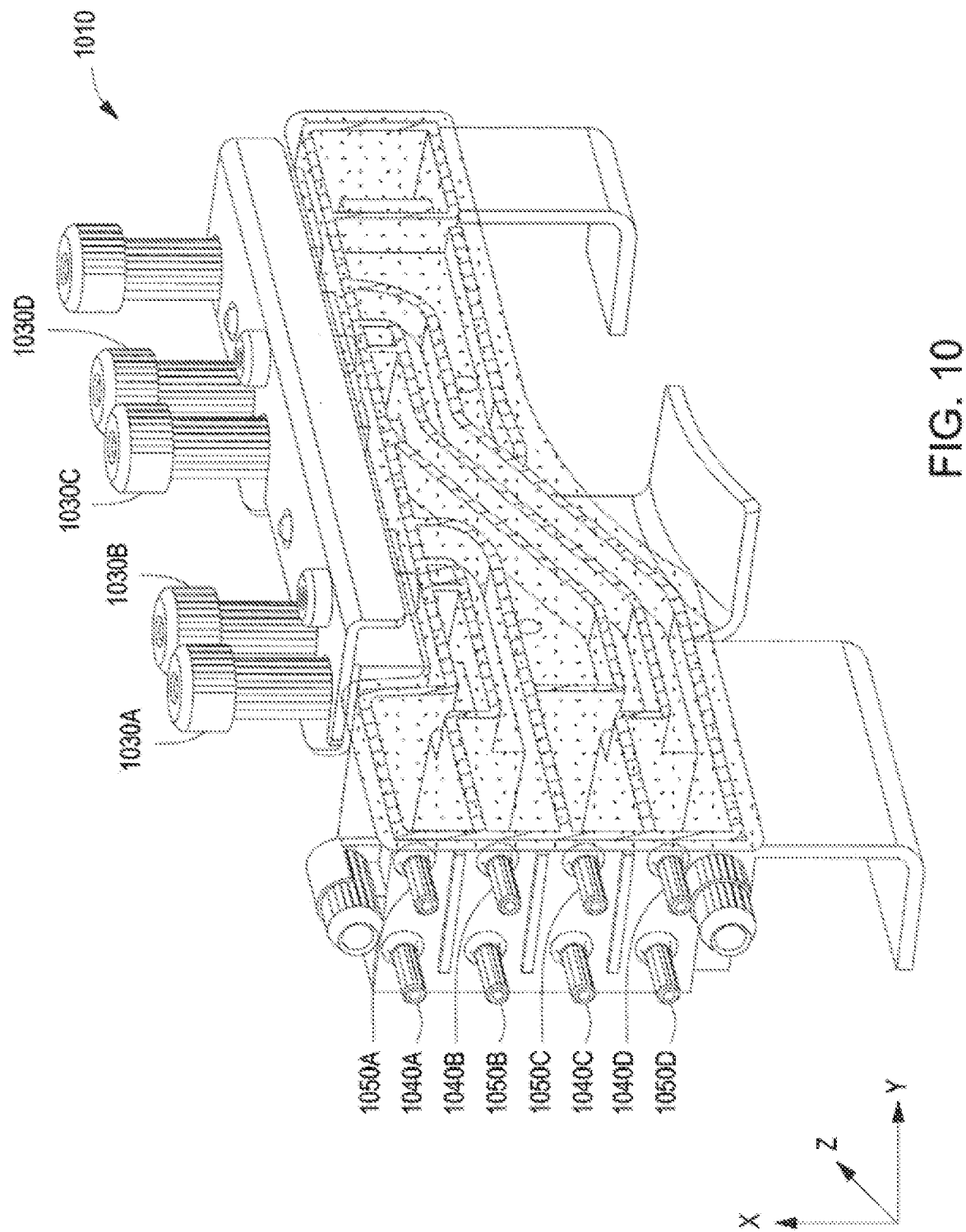
FIG. 10 is a perspective view of an example purging manifold.

FIG. 10 is a perspective view of an example purging manifold 1010. FIG. 11 is a left side view of the example purging manifold of FIG. 10. FIG. 12 is a side cross-sectional view of an example of the example purging manifold of FIG. 11 taken along line 12-12'. In the example of FIGS. 10-12, purging manifold 1010 includes four reservoirs: first reservoir 1020A, second reservoir 1020B, third reservoir 1020C, and fourth reservoir 1020D to house or store fluids. In some examples, each reservoir may receive a different type of printing material. In other examples, each reservoir may receive the same printing material. In examples, each reservoir of purging manifold 1010 includes ports associated therewith similar to the ports described above with respect to FIGS. 1-4. In the example of FIGS. 10-12, a supply port of each reservoir includes a fluid interface connector similar to fluid interface connector 635 described with reference to FIGS. 5-9. In such examples, purging manifold 1010 may fluidically connect to a fluid ejection device via the supply ports thereof.

In examples, first reservoir 1020A may include a first supply port 1030A, a first fluid inlet port 1050A, and a first purging outlet port 1040A. A fluid entering first reservoir 1020A may follow a fluid path shown by arrows 1022A. In examples, an external pressure may be provided to fluid in first reservoir 1020A to establish fluid path 1022A, such as from a pump. In examples, first supply port 1030A may supply liquid printing material from any fluid housed in first reservoir 1020A. In examples, first supply port 1030A may be fluidically connected to a fluid ejection device when purging manifold 1010 is coupled to a printing system. In examples, first fluid inlet port 1050A may convey a first fluid to first reservoir 1020A and may be disposed above first supply port 1030A against the force of gravity on the first fluid. In such examples, the force of gravity on the first fluid may be along a negative x-direction of FIGS. 10-12. In examples, first purging outlet port 1040A may be disposed above first supply port 1030A to convey a first fluid from first reservoir 1030A. In such examples, in operation, as described with respect to FIGS. 3A-3C, a first fluid in first reservoir 1020A following flow arrows 1022A may separate into a gas layer and a liquid layer. In the example of first reservoir 1020A, the first fluid has not separated into a gas layer and a liquid layer. In such examples, first supply port 1030A may be disposed proximate a bottom of first reservoir 1020A to convey liquid printing material to a fluid ejection device. Furthermore, in such an example first purging outlet port 1040A may be disposed above first supply port 1030A to convey a fluid, for example from a liquid layer, to another reservoir of a printing system.

In examples, second reservoir 1020B may include a second supply port 1030B, a second fluid inlet port 1050B, and a second purging outlet port 1040B. A fluid entering second reservoir 1020B may follow a fluid path shown by arrows 1022B. In examples, second supply port 1030B may supply liquid printing material from any fluid housed or stored in second reservoir 1020B. In examples, second supply port 1030B may be fluidically connected to a fluid ejection device when purging manifold 1010 is coupled to a printing system. In examples, second fluid inlet port 1050B may convey a second fluid to second reservoir 1020B and may be disposed above second supply port 1030B against the force of gravity on the second fluid. In such examples, the force of gravity on the second fluid may be along a negative x-direction. In examples, second purging outlet port 1040B may be disposed above second supply port 1030B to convey a second fluid from second reservoir 1020B. In such examples, in operation, as described with respect to FIGS. 3A-3C, a second fluid in second reservoir 1020B following flow arrows 1022B may separate into a gas layer 1023B and a liquid layer 1025B. In such examples, second supply port 1030B may be disposed proximate a bottom of second reservoir 1020B to convey liquid printing material to a fluid ejection device. Furthermore, in such an example second purging outlet port 1040B may be disposed above second supply port 1030B to convey a fluid, for example from gas layer 1023B, to another reservoir of a printing system.

In examples, third reservoir 1020C may include a third supply port 1030C, a third fluid inlet port 1050C, and a third purging outlet port 1040C. A fluid entering third reservoir 1020C may follow a fluid path shown by arrows 1022C. In examples, third supply port 1030C may supply liquid printing material from any fluid housed or stored in third reservoir 1020C. In examples, third supply port 1030C may be fluidically connected to a fluid ejection device when purging manifold 1010 is coupled to a printing system. In examples, third fluid inlet port 1050C may convey a third fluid to third reservoir 1020C and may be disposed above third supply port 1030C against the force of gravity on the third fluid. In such examples, the force of gravity on the third fluid may be along a negative x-direction. In examples, third purging outlet port 1040C may be disposed above third supply port 1030C to convey a third fluid from third reservoir 1020C. In such examples, in operation, as described with respect to FIGS. 3A-3C, a third fluid in third reservoir 1020C following flow arrows 1022C may separate into a gas layer and a liquid layer. In the example of third reservoir 1020C, the third fluid has not separated into a gas layer and a liquid layer. In such examples, third supply port 1030C may be disposed proximate a bottom of third reservoir 1020C to convey liquid printing material to a fluid ejection device. Furthermore, in such an example third purging outlet port 1040C may be disposed above third supply port 1030C to convey a fluid, for example from a liquid layer, to another reservoir of a printing system.

In examples, fourth reservoir 1020D may include a fourth supply port 1030D, a fourth fluid inlet port 1050D, and a fourth purging outlet port 1040D. A fluid entering fourth reservoir 1020D may follow a fluid path shown by arrows 1022D. In examples, fourth supply port 1030D may supply liquid printing material from any fluid housed or stored in fourth reservoir 1020D. In examples, fourth supply port 1030D may be fluidically connected to a fluid ejection device when purging manifold 1010 is coupled to a printing system. In examples, fourth fluid inlet port 1050D may convey a fourth fluid to fourth reservoir 1020D and may be disposed above fourth supply port 1030D against the force of gravity on the fourth fluid. In such examples, the force of gravity on the fourth fluid may be along a negative x-direction. In examples, fourth purging outlet port 1040D may be disposed above fourth supply port 1030D to convey a fourth fluid from fourth reservoir 1020D. In such examples, in operation, as described with respect to FIGS. 3A-3C, a fourth fluid in fourth reservoir 1020D following flow arrows 1022D may separate into a gas layer 1023D and a liquid layer 1025D. In such examples, fourth supply port 1030D may be disposed proximate a bottom of fourth reservoir 1020D to convey liquid printing material to a fluid ejection device. Furthermore, in such an example fourth purging outlet port 1040D may be disposed above fourth supply port 1030D to convey a fluid, for example from gas layer 1023D, to another reservoir of a printing system.

In the example of FIGS. 10-12, various purging outlet ports and fluid inlet port are shown as substantially parallel to each other. Although the examples are not limited to such substantially parallel arrangements, it will be appreciated that such an arrangement may allow for the interchanging of purging outlet ports and fluid inlet ports without altering the operation of purging manifold 1010. In other words, which port of a fluid manifold is a purging outlet port and a fluid inlet port may be determined according to which port of another reservoir (e.g., first reservoir 200) each port is coupled to (e.g., a recirculation port or an output port).

While various examples are described herein, elements and/or combinations of elements may be combined and/or removed for various examples contemplated hereby. Furthermore, in some examples, various components of the example systems and devices of FIGS. 1-12 may be removed, and/or other components may be added.

The preceding description has been presented to illustrate and describe examples of the principles described. This description is not intended to be exhaustive or to limit these principles to any precise form disclosed. Many modifications and variations are possible in light of the description. Therefore, the foregoing examples provided in the figures and described herein should not be construed as limiting of the scope of the disclosure, which is defined in the Claims.

The invention claimed is:

1. A fluid ejection system, comprising:
   a first reservoir to store a fluid;
   a purging manifold to fluidically couple to the fluid ejection device, the purging manifold to fluidically couple to the first reservoir, the purging manifold having a second reservoir, the purging manifold comprising:
   a supply port to supply degassed fluid from the second reservoir to the fluid ejection device;
   a fluid inlet port to convey fluid to the second reservoir from the first reservoir; and
   a purging outlet port disposed above the supply port to convey fluid to the first reservoir, and
   a fluid interface connector to fluidically connect to the supply port and fluidically connect to a fluid ejection device.

2. The fluid ejection system of claim 1, wherein the fluid interface connector is a needle/septum interface.

3. The fluid ejection system claim 1, wherein the fluid inlet port is disposed above the supply port.

4. The fluid ejection system of claim 1, wherein the purging manifold is filterless.

5. The fluid ejection system of claim 1, wherein the purging outlet port is to convey fluid including separated air from the second reservoir to the first reservoir.

6. The fluid ejection system of claim 1, wherein the supply port is to supply a liquid printing material to the fluid ejection device.

7. A fluid ejection system, comprising:
   a first reservoir comprising:
      an input port to receive fluid;
      an output port to supply fluid from the first reservoir;
      a recirculation port to receive fluid from a first purging manifold; and
      a vent port to communicate with an atmosphere;
   the first purging manifold to fluidically couple to the first reservoir and fluidically connect to a fluid ejection device, the first purging manifold having a second reservoir, the first purging manifold comprising:
      a supply port to supply degassed fluid from the second reservoir to the fluid ejection device;
      a fluid inlet port to convey fluid to the second reservoir; and
      a purging outlet port disposed above the supply port to convey fluid to the first reservoir;
   a first fluid conduit to couple the fluid inlet port to the output port to convey fluid to the second reservoir; and
   a second fluid conduit to couple the purging outlet port to the recirculation port to convey the fluid to the first reservoir.

8. The fluid ejection system of claim 7, wherein the purging outlet port is to convey a fluid including separated gas from the second reservoir to the first reservoir.

9. The fluid ejection system of claim 7, wherein the first fluid conduit and the second fluid conduit each are comprised of a flexible material.

10. The fluid ejection system of claim 7, wherein the first purging manifold is filterless.

11. The fluid ejection system of claim 7, further comprising a second purging manifold to fluidically couple to the first reservoir and fluidically couple to the fluid ejection device.

12. A fluid ejection system, comprising:
   a first reservoir comprising:
      an input port to receive fluid;
      an output port to supply fluid from the first reservoir;
      a recirculation port to receive fluid from a first purging manifold; and
      a vent port to communicate with an atmosphere;
   the first purging manifold to fluidically couple to the first reservoir and fluidically connect to a fluid ejection device, the first purging manifold having a second reservoir, the first purging manifold comprising:
      a supply port to supply degassed fluid from the second reservoir to the fluid ejection device;
      a fluid inlet port to convey fluid to the second reservoir; and
      a purging outlet port disposed above the supply port to convey fluid to the first reservoir;
   a first fluid conduit to couple the fluid inlet port to the output port to convey fluid to the second reservoir;
   a second fluid conduit to couple the purging outlet port to the recirculation port to convey the fluid to the first reservoir; and
   a second purging manifold to fluidically couple to a third reservoir and fluidically couple to the fluid ejection device.

13. The fluid ejection system of claim 12, wherein the purging outlet port is to convey a fluid including separate gas from the second reservoir to the first reservoir.

\* \* \* \* \*